Figure 1:
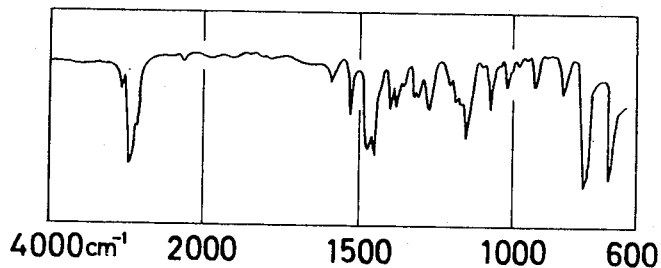

United States Patent [19]
Nagaoka et al.

[11] 3,755,289
[45] Aug. 28, 1973

[54] 2-(PHENYLAZO)-2,4-DIMETHYL AND 2-(PHENYLAZO)-2,4-DIMETHYL-4-ALKOXY VALERONITRILES

[75] Inventors: Joji Nagaoka, Tokyo; Kazuhiko Yamashita, Wako; Shin-Ichi Kitashima; Kenichiro Fukuma, both of Tokyo, all of Japan

[73] Assignees: Kansai Paint Co., Ltd., Hyogo-ken; Wako Pure Chemical Industries, Ltd., Osaka, both of Japan

[22] Filed: Mar. 18, 1971

[21] Appl. No.: 125,489

[30] Foreign Application Priority Data
Mar. 25, 1970 Japan.............................. 45/24393
May 15, 1970 Japan.............................. 45/40928

[52] U.S. Cl. ............... 260/192, 96/91 R, 96/115 P, 260/193
[51] Int. Cl. .......................................... C07c 107/00
[58] Field of Search........................... 260/192, 193

[56] References Cited
UNITED STATES PATENTS
3,222,356   12/1965   Burg .............................. 260/192 X
2,515,691   7/1950   Beersmans...................... 260/193 X

*Primary Examiner*—Lewis Gotts
*Assistant Examiner*—C. F. Warren
*Attorney*—Ostrolenk, Faber, Gerb & Soffen

[57] ABSTRACT

Photosensitizers useful as photo-polymerization catalysts are 2-(phenylazo)-2,4-dimethyl and 2-(phenylazo)-2,4-dimethyl-4-alkoxy valeronitriles represented by the following general formula:

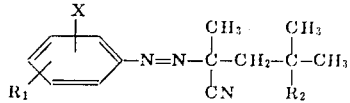

wherein X is a hydrogen atom or a halogen atom; $R_1$ represents a hydrogen atom, a halogen atom or an alkyl group having one to eight carbon atoms; and $R_2$ represents a hydrogen atom or an alkoxy group with one to four carbon atoms.

23 Claims, 7 Drawing Figures

2-(PHENYLAZO)-2,4-DIMETHYL AND 2-(PHENYLAZO)-2,4-DIMETHYL-4-ALKOXY VALERONITRILES

The present invention relates to 2-(phenylazo)-2,4-dimethyl and 2-(phenylazo)-2,4-dimethyl-4-alkoxy valeronitriles useful as photosensitizers in photo-polymerization.

More particularly this invention relates to 2-(phenylazo)-2,4-dimethyl and 2-(phenylazo)-2,4-dimethyl-4-alkoxy valeronitriles useful as photosensitizers for photo-polymerization which are obtained by oxidizing the respective hydrazo compound which is obtained by first reacting phenyl hydrazine or its derivatives with 4-methyl- or 4-methyl-4-alkoxy-pentan-2-one to prepare ketazine, and then reacting the ketazine with hydrogen cyanide to obtain the hydrazo compound.

It is well known that benzoin derivatives and phenyl- or nahthyl-azo-lower-alkylnitriles have been used as a photo-sensitizer for photo-polymerization, for example, in curing a photo-polymerizable coating composition such as an unsaturated polyester composition. Although the benzoin derivatives, e.g., benzoin methyl ether and benzoin ethyl ether, have the characteristic of very rapidly cross-linking a photo-polymerizable composition with irradiating light (2,000 – 7,000 A), a photo-polymerizable composition which contains benzoin derivatives as the photosensitizer begins to harden in storage of the composition, particularly containing pigment and/or metal dryer. Therefore benzoin derivatives as photosensitizers are not desirable.

It is also known that a photo-polymerizable composition which contains phenyl- or naphthyl-azo-lower-alkylnitriles, e.g., phenylazo isobutyronitrile and naphthylazo isobutyronitrile, as a sensitizer have the characteristic of excellent storage stability. However a disadvantage of these sensitizers is to need a very long period for cross-linking the composition in spite of irradiating with strong light (2,000 – 7,000 A). For the foregoing reasons, it is undesirable to use these sensitizers as a photo-sensitizer for the general photo-polymerizable composition.

The object of the present invention is to provide a photosensitizer which has excellent storage stability of a photo-polymerizable composition containing the photosensitizer and capable of causing a photo-polymerizable composition to cross-linking in a short period of time on exposure to light (2,000 – 7,000 A). In other words, an object of the present invention is to provide a compound which is able to let the photo-polymerizable composition cross-link by irradiating light as fast in velocity as using benzoin derivatives.

We now have found that new photosensitizers which cause a photo-polymerizable composition to cross-link by irradiating light are 2-(phenylazo)-2,4-dimethyl and 2-(phenylazo)-2,4-dimethyl-4-alkoxy valeronitriles represented by asymmetric compounds of the following general structure:

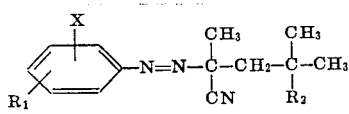

wherein;

X represents hydrogen atom or halogen atom;

$R_1$ represents hydrogen atom, halogen atom or alkyl group having one to eight carbon atoms; and $R_2$ represents hydrogen atom or alkoxy group having one to four carbon atoms.

Suitable photosensitizers of the present invention are, for example, (1) 2-(phenylazo)-2,4-dimethyl valeronitrile, (2) 2-(tolylazo)-2,4-dimethyl valeronitrile, (3) 2-(octylphenylazo)-2,4-dimethyl valeronitrile, (4) 2-(chlorophenylazo)-2,4-dimethyl valeronitrile, (5) 2-(dichlorophenylazo)-2,4-dimethyl valeronitrile, (6) 2-(ethyl monochlorophenyl)-2,4-dimethyl valeronitrile, (7) 2-(hexyl monobromo phenylazo)-2,4-dimethyl valeronitrile, (8) 2-(phenylazo)-2,4-dimethyl-4-methoxy valeronitrile, (9) 2-(tolylazo)-2,4-dimethyl-4-methoxy valeronitrile, (10) 2-(hexylphenylazo)-2,4-dimethyl-4-methoxy valeronitrile, (11) 2-(heptylphenylazo)-2,4-dimethyl-4-methoxy valeronitrile, (12) 2-(monochlorophenylazo)-2,4-dimethyl-4-methoxy valeronitrile, (13) 2-(dichlorophenylazo)-2,4-dimethyl-4-methoxy valeronitrile, (14) 2-(hexyl monobromo phenylazo)-2,4-dimethyl-4-methoxy valeronitrile, (15) 2-(phenylazo)-2,4-dimethyl-4-propoxy valeronitrile, (16) 2-(phenylazo)-2,4-dimethyl-4-butoxy valeronitrile, (17) 2-(chlorophenylazo)-2,4-dimethyl-4-butoxy valeronitrile, (18) 2-(tolylazo)-2,4-dimethyl-4-butoxy valeronitrile, (19) 2-(hexylphenylazo)-2,4-dimethyl-4-butoxy valeronitrile, (20) 2-(dichlorophenylazo)-2,4-dimethyl-4-butoxy valeronitrile, (21) 2-(propylmonochlorophenylazo)-2,4-dimethyl-4-butoxy valeronitrile.

2-(phenylazo)-2,4-dimethyl and 2-(phenylazo)-2,4-dimethyl-4-alkoxy valeronitriles of the present invention are manufactured by according to following reaction formulas.

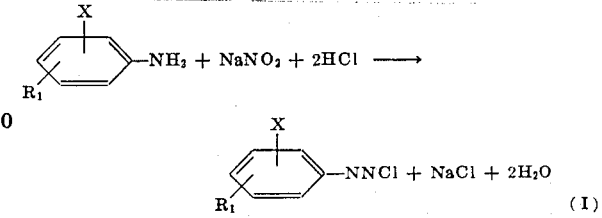
(I)

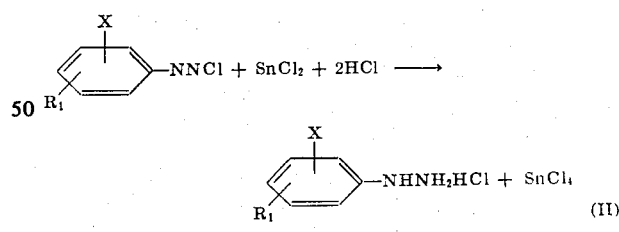
(II)

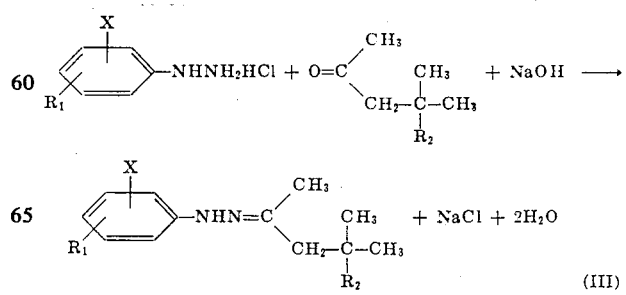

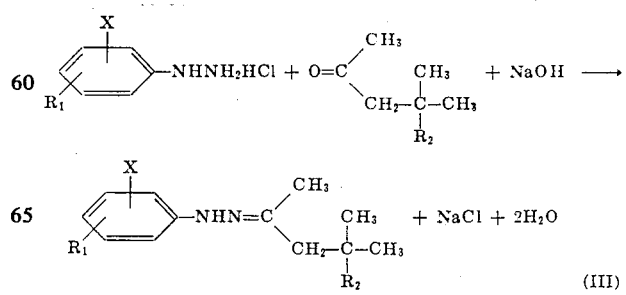
(III)

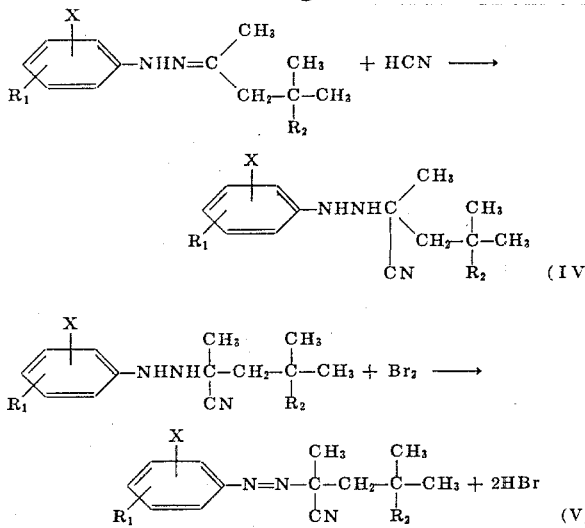

The Diazo reaction (I) and the diazonium compound's reduction (II) are carried out according to a usual chemical method. Therefore the temperature of reaction (I) or (II) is desirable under 5°C or 15°C, respectively. The amount of sodium nitrite or stannous chloride is respectively 1.2 times of equivalent to the theoretical.

Another starting material of the reaction (III), having the general formula,

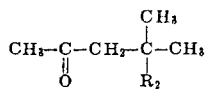

[$R_2$ represents hydrogen atom or alkoxy group of one to four carbon atoms]. for example, methyl isobutyl ketone, methyl-$\beta$-methoxy butyl ketone, methyl-$\beta$-butoxy butyl ketone, is manufactured from mesityl oxide, a corresponding alcohol and potassium hydroxide or conc. sulfuric acid. Reaction temperature is room or slightly warmer temperature. Reaction period is 1 to 10 days. Reaction (III) is carried out at the boiling point in the most cases. Reaction solvent is not always necessary, for the ketones of the starting material may play the part of the reaction solvent, but if desired, any solent may be used unless the reaction is thereby hindered. After reacting, ketazine is distilled under reduced pressure.

The reaction (IV) which adds hydrogen cyanide to ketazine is carried out at a temperature under 40°C, preferably 20° to 30°C. In this case, both liquid and aqua hydrogen cyanide are adoptable. After 6 to 12 hours reaction time, the hydrazo compound separates out as a crystal from the reaction solution. Yield is about 70 percent.

The oxidizing reaction (V) is practiced under 20°C in most cases. Reaction solvent is not always necessary. If desired, inert solvent or its suitable mixture may be used in the reaction. As a inert solvent, hexane, dichloroethane, chloroform, benzene, toluene, or dimethyl formamide can be used. As oxidizing agents, chlorine and bromine can be used. Also it is occasionally observed that when both chlorine and bromine is used, the reaction is accelerated.

As detailed above, a photo-polymerizable composition which contains valeronitrile derivatives obtained by the present invention as a photosensitizer has an excellent storage stability and is capable of use in wide areas of industry. Moreover, the hardening velocity of valeronitrile derivatives of the present invention is same as that of the benzoin derivatives. The valeronitrile derivatives of the present invention are also useful as other polymerization initiator.

The following examples represent presently-preferred illustrative embodiments of the invention. In the following examples, parts and % are by weight.

And further, the invention will be better understood by the accompanying drawings in which:

FIGS. 1 to 7 are infrared spectra of each compound obtained in examples 1 to 7.

EXAMPLE 1

A mixture of 108 parts of phenylhydrazine and 100 parts of isopropylacetone was stirred and heated at 90°–95°C for 2 hours. The reaction mixture was then cooled, dried over $Na_2SO_4$, and distilled. The yield of isopropylacetone phenylhydrazone, $(CH_3)_2CHCH_2C(CH_3)=NNHC_6H_5$, b.p. 98°–103°C (3 mm Hg), was 186 parts. Also using a reaction solvent such as benzene, methanol, heptane and cyclohexane, this compound was obtained.

In an closed vessel, a mixture of 150 parts of isopropylacetone phenylhydrazone and 100 parts of liquid HCN was allowed to stir for 5 hours at room temperature. After n-hexane and water were added and stirred for 10 minutes, the product which had precipitated out was collected by filtration, washed with water, and dried. White crystals of 2-(phenylhydrazino)-2,4-dimethyl valeronitrile, $(CH_3)_2CHCH_2C(CH_3)(CN)NHNHC_6H_5$, m.p. 66°–67°C, were obtained. The yield was 146 parts. In place of liquid HCN, a solution of HCN in water or usual organic solvents was also used.

A mixture of bromine (120 parts), KBr (50 parts) and water (250 parts) was added into the cooled and stirred solution of 2-(phenylhydrazino)-2,4-dimethyl valeronitrile (109 parts) in chloroform (400 parts). For one hour the reaction temperature was kept at 0°–5°C. Then the organic layer was separated, washed with water, and distilled. Pure 2-(phenylazo)-2,4-dimethyl valeronitrile (101 parts), $(CH_3)_2CHCH_2C(CH_3)(CN)N=NC_6H_5$, b.p. 111°–112°C (0.3 mm Hg), was obtained. The infrared spectrum of the compound thus obtained is shown in FIG. 1. The analysis was: Calcd. for $C_{13}H_{17}N_3$: C, 72.52; H, 7.96; N, 19.52; Found: C, 72.52; H, 7.98; N, 19.51. Instead of chloroform, other usual organic solvents were also used. And in place of the combination of bromine and KBr, combinations of HBr and bromine, of HCl and chlorine, of $CaCl_2$, and chlorine, and so on were used for the same object.

EXAMPLE 2

After refluxing a mixture of 4-methoxy-4-methylpentan-2-one (130 parts), phenylhydrazine (108 parts), and benzene (300 parts), distillation gave 4-methoxy-4-methylpentan-2-one phenylhydrazone (219 parts), b.p. 140°–142°C (3 mm Hg.) A mixture of the above-mentioned hydrazone (219 parts), water (150 parts), methanol (50 parts) and HCN (80 parts) was stirred for 10 hours at 20°–25°C. Crystals of 2-

Figure 2:
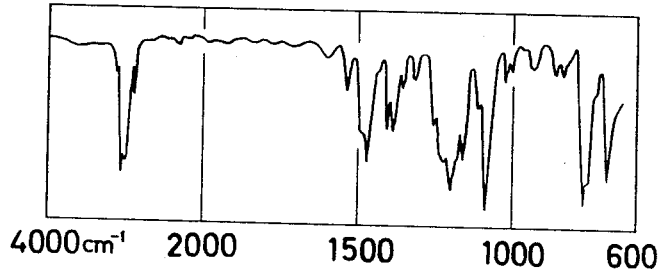

(phenylhydrazino)-2,4-dimethyl-4-methoxy valeronitrile (199 parts), m.p. 90°–91°C, were obtained. A mixture of the said hydrazino-compound (124 parts), bromine (120 parts), toluene (1,000 parts) and water (330 parts) was stirred for 5 hours at 0°–5°C, and then the separted organic layer was washed with water and distilled. 2-(phenylazo)-2,4-dimethyl-4-methoxy valeronitrile (110 parts), $(CH_3)_2C(OCH_3)CH_2C(CH_3)(CN)N=NC_6H_5$, b.p. 113– 115°C (0.1 mm Hg), was obtained. The infrared spectrum of the compound thus obtained is shown in FIG. 2. The analysis was: Calcd. for $C_{14}H_{19}N_3O$: C, 68.54; H, 7.81; N, 17.13; Found: C, 68.36; H, 7.93; N, 17.04.

EXAMPLE 3

Figure 3:
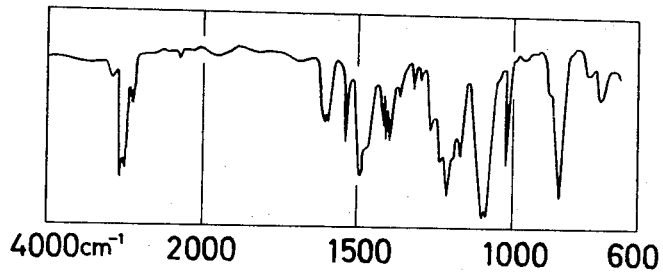

In place of phenylhydrazine in Example 2, 4-chlorophenylhydrazine was used and the general procedure of Example 2 was repeated. But in the last step, chlorine (42 parts) was introduced into the stirred and cooled mixture of 2-(4-chlorophenylhydrazino)-2,4-dimethyl-4-methoxy valeronitrile (140 parts) and 6 percent HCl aq. solution (300 parts) at about 5°C and the stirring was continued for 2 hours at same temperature. This distillation of the organic layer gave 2-(4-chlorophenylazo)-2,4-dimethyl-4-methoxy valeronitrile (137 parts), $(CH_3)_2C(OCH_3)CH_2C(CH_3)(CN)N=NC_6H_4Cl$, which was: Calcd. for $C_{14}H_{18}N_3Cl$: C, 63.75; H, 7.87; N, 15.93; Found: C, 63.64; H, 7.75; N, 15.86. The overall yield was 33.5 percent. The infrared spectrum of the compound thus obtained is shown in FIG. 3.

EXAMPLE 4

Figure 4:
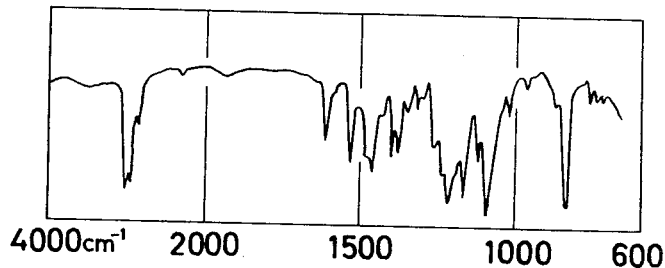

The general procedure of Example 1 was repeated with 4-methoxy-4-methylpentan-2-one as the ketone and p-tolylhydrazine as the hydrazine. There was obtained a 22.7 percent yield of pure 2-(p-tolylazo)-2,4-dimethyl-4-methoxy valeronitrile, $(CH_3)_2C(OCH_3)CH_2C(CH_3)(CN)N=NC_6H_4CH_3$, when the solvents were evaporated entirely. The infrared spectrum of the compound thus obtained is shown in FIG. 4. The analysis was: Calcd. for $C_{15}H_{21}N_3O$: C, 69.46; H, 8.16; N, 16.21; Found: C, 69.35; H, 8.06; N, 16.25.

EXAMPLE 5

Figure 5:
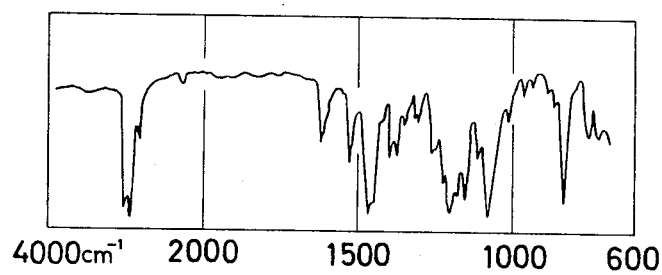

The general procedure of Example 1 was repeated with 4-methoxy-4-methylpentan-2-one and 4-heptylphenylhydrazine. There was obtained a 19.5 percent yield of pure 2-(4-heptylphenylazo)-2,4-dimethyl-4-methoxy valeronitrile, $(CH_3)_2C(OCH_3)CH_2C(CH_3)(CN)N=NC_6H_4C_7H_{15}$, when the solvents were evaporated entirely. The infrared spectrum of the compound thus obtained is shown in FIG. 5. The analysis was: Calcd. for $C_{21}H_{33}N_3O$: C, 73.00; H, 10.21; N, 12.16; Found: C, 73.10; H, 10.05, N, 12.06.

EXAMPLE 6

Figure 6:
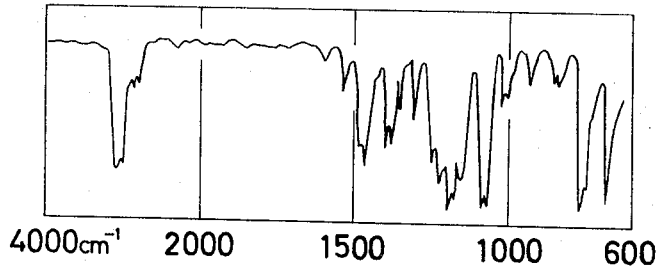

The general procedure of Example 1 was repeated with 4-isopropoxy-4-methylpentan-2-one and phenylhydrazine. There was obtained at 17.6 percent yield of pure 2-(phenylazo)-2,4-dimethyl-4-isopropoxy valeronitrile, $(CH_3)_2CHOC(CH_3)_2CH_2C(CH_3)(CH)N=NC_6H_5$ when the solvents were evaporated entirely. The infrared spectrum of the compound thus obtained is shown in FIG. 6. The analysis was: Calcd. for $C_{16}H_{23}N_3O$: C, 70.29; H, 8.48; N, 15.37; Found: C, 70.12; H, 8.24; N, 15.21.

EXAMPLE 7

Figure 7:
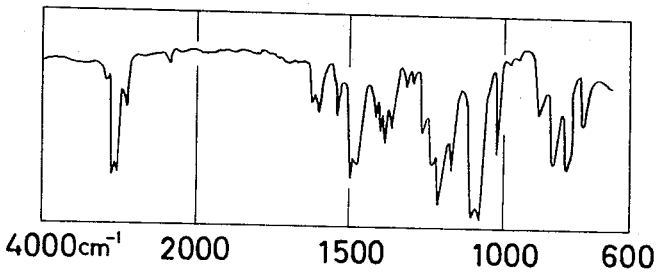

The general procedure of Example 1 was repeated with 4-methoxy-4-methylpentan-2-one and 3,4-dichlorophenylhydrazine. However, the -cyanation of the hydrazone was carried by treatment with dry HCN at about 80°C in a closed vessel. There was obtained a 10.9 percent yield of pure 2-(3,4-dichlorophenylazo)-2,4-dimethyl-4-methoxy valeronitrile, $(CH_3)_2C(OCH_3)CH_2C(CH_3)(CN)N=NC_6H_3Cl_2$, when the solvents were evaporated entirely. The infrared spectrum of the compound thus obtained is shown in FIG. 7. The analysis was: Calcd. for $C_{14}H_{17}Cl_2N_3O$: C, 53.65; H, 5.47; N, 13.45; Found: C, 53.45; H, 5.51; N, 13.32.

EXAMPLE 8

Table I shows the results of the photo-polymerizing time and thermostability of photosensitizer obtained in the present invention.

For comparison, Table I also shows the results of the photo-polymerizing time and thermostability of benzoin derivatives and phenyl- or naphtylazo-lower-alkyl nitriles as well known photosensitizer, in the same conditions.

From Table I, it is obvious that the new photosensitizers of the present invention have excellent photopolymerizing time and thermostability compared with well known photosensitizers.

TABLE I

| Photosensitizers [1] | Photopolymerizing time [2] (sec.) | Thermostability [3] 40° C. (days) | Thermostability [3] 100° C. (min.) |
|---|---|---|---|
| New photosensitizers of the present invention: | | | |
| (1) | 85 | 45 | 30 |
| (2) | 80 | 45 | 30 |
| (3) | 80 | 45 | 30 |
| (4) | 60 | 30 | 20 |
| (5) | 60 | 30 | 20 |
| (6) | 60 | 30 | 20 |
| (7) | 60 | 30 | 20 |
| (8) | 70 | 35 | 25 |
| (9) | 70 | 35 | 25 |
| (10) | 70 | 35 | 25 |
| (11) | 60 | 30 | 20 |
| (12) | 60 | 30 | 20 |
| (13) | 60 | 30 | 20 |
| (14) | 60 | 30 | 20 |
| (15) | 75 | 40 | 25 |
| (16) | 75 | 40 | 25 |
| (17) | 60 | 30 | 20 |
| (18) | 75 | 40 | 25 |
| (19) | 75 | 40 | 25 |
| (20) | 60 | 40 | 25 |
| (21) | 60 | 40 | 25 |
| Well known photosensitizers: | | | |
| Benzoin methyl ether | 80 | 1 | 1 |
| Benzoin ethyl ether | 85 | 1 | 1 |
| Benzoin isopropyl ether | 90 | 1 | 1 |
| Phenylazo isobutyronitrile | 600 | 20 | 10 |
| Naphthylazo isobutyronitrile | 900 | 20 | 10 |

[1] 2 parts of photosensitizer was dissolved in enamel obtained by grinding a mixture of 60 parts of unsaturated polyester resin (consisting of fumaric acid/tetrahydrophthalic anhydride/linseed fatty acid/ethylene glycol/diethylene glycol =7/3/1/8.5/3 in molar ratio; prepared by conventional procedure), 40 parts of styrene monomer, 100 parts of talc $(H_2Mg_3Si_4O_8)$, and 1 part of 12% toluene solution of cobalt naphthenate.
[2] Unsaturated polyester enamel dissolved photosensitizer was coated to a thickness of 50 microns on one side of glass plate of 1.5 mm. thickness and irradiated with a 400 W. high pressure mercury lamp at an irradiation distance of 20 cm., and photopolymerizing time was measured until pencil hardness was 3H.
[3] Thermostability test was carried out at 40° C. and 100° C. in dark room, and time of gellation was measured.

What is claimed is:

1. A 2-(phenylazo)-2,4-dimethyl valeronitrile having the formula:

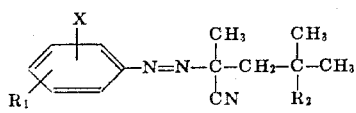

wherein X represents hydrogen, chlorine or bromine; and $R_1$ represents X or an alkyl group having one to eight carbon atoms.

2. 2-(phenylazo)-2,4-dimethyl valeronitrile in accordance with claim 1.

3. 2-(tolylazo)-2,4-dimethyl valeronitrile in accordance with claim 1.

4. 2-(octylphenylazo)-2,4-dimethyl valeronitrile in accordance with claim 1.

5. 2-(chlorophenylazo)-2,4-dimethyl valeronitrile in accordance with claim 1.

6. 2-(dichlorophenylazo)-2,4-dimethyl valeronitrile in accordance with claim 1.

7. 2-(ethyl monochlorophenyl)-2,4-dimethyl valeronitrile in accordance with claim 1.

8. 2-(hexyl monobromo phenylazo)-2,4-dimethyl valeronitrile in accordance with claim 1.

9. A 2-(phenylazo)-2,4-dimethyl-4-alkoxy valeronitrile having the formula:

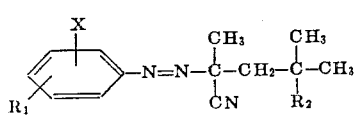

wherein X represents hydrogen, chlorine or bromine; $R_1$ represents X or an alkyl group having one to eight carbon atoms; and $R_2$ represents an alkoxy group having one to four carbon atoms.

10. 2-(phenylazo)-2,4-dimethyl-4-methoxy valeronitrile in accordance with claim 9.

11. 2-(tolylazo)-2,4-dimethyl-4-methoxy valeronitrile in accordance with claim 9.

12. 2-(hexylphenylazo)-2,4-dimethyl-4-methoxy valeronitrile in accordance with claim 9.

13. 2-(heptylphenylazo)-2,4-dimethyl-4-methoxy valeronitrile in accordance with claim 9.

14. 2-(monochlorophenylazo)-2,4-dimethyl-4-methoxy valeronitrile in accordance with claim 9.

15. 2-(dichlorophenylazo)-2,4-dimethyl-4-methoxy valeronitrile in accordance with claim 9.

16. 2-(hexyl monobromophenylazo)-2,4-dimethyl-4-methoxy valeronitrile in accordance with claim 9.

17. 2-(phenylazo)-2,4-dimethyl-4-propoxy valeronitrile in accordance with claim 9.

18. 2-(phenylazo)-2,4-dimethyl-4-butoxy valeronitrile in accordance with claim 9.

19. 2-(chlorophenylazo)-2,4-dimethyl-4-butoxy valeronitrile in accordance with claim 9.

20. 2-(tolylazo)-2,4-dimethyl-4-butoxy valeronitrile in accordance with claim 9.

21. 2-(hexylphenylazo)-2,4-dimethyl-4-butoxy valeronitrile in accordance with claim 9.

22. 2-(dichlorophenylazo)-2,4-dimethyl-4-butoxy valeronitrile in accordance with claim 9.

23. 2-(propylmonochlorophenylazo)-2,4-dimethyl-4-butoxy valeronitrile in accordance with claim 9.

* * * * *